Figure 2:
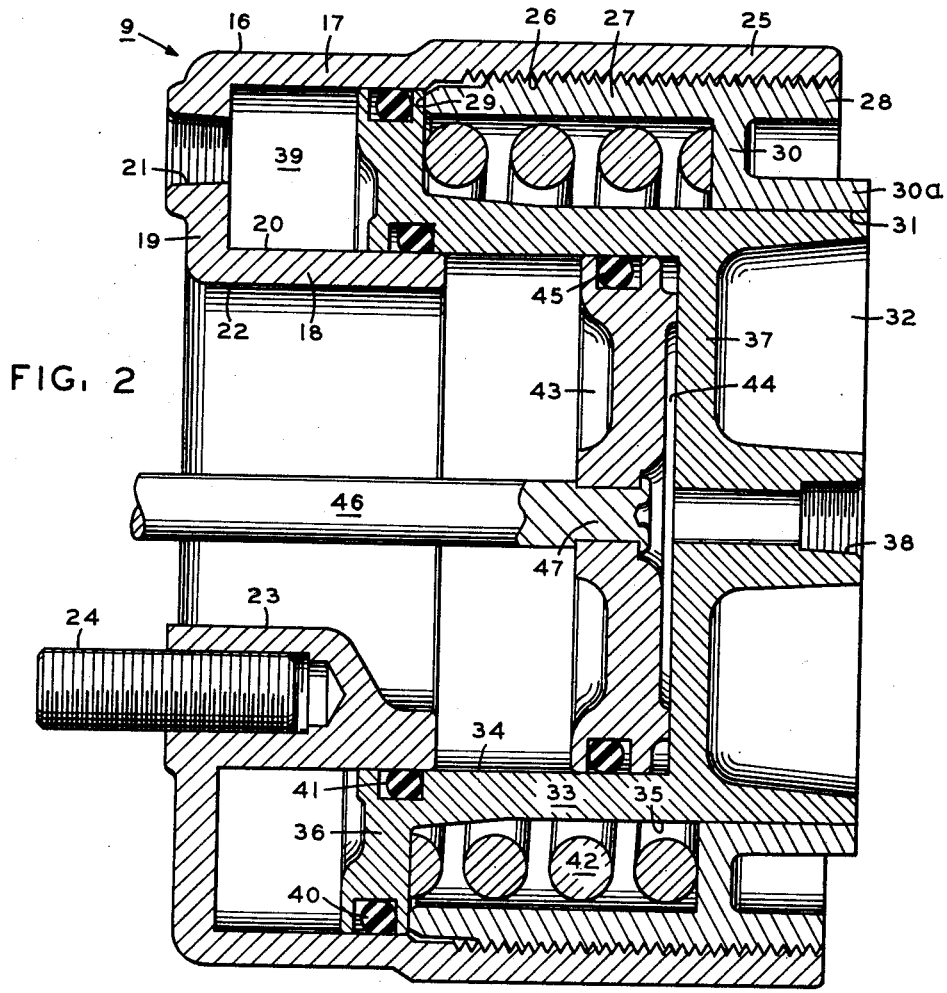

June 15, 1965   O. B. CRUSE   3,188,922
FRICTION DEVICE OPERATING MECHANISM
Filed Oct. 12, 1962   6 Sheets-Sheet 1

INVENTOR
OLIVER B. CRUSE
BY
Joseph E. Papin

June 15, 1965

O. B. CRUSE 3,188,922

FRICTION DEVICE OPERATING MECHANISM

Filed Oct. 12, 1962

6 Sheets-Sheet 3

INVENTOR
OLIVER B. CRUSE
BY

June 15, 1965

O. B. CRUSE 3,188,922

FRICTION DEVICE OPERATING MECHANISM

Filed Oct. 12, 1962

6 Sheets-Sheet 4

INVENTOR
OLIVER B. CRUSE
BY

INVENTOR
OLIVER B. CRUSE
BY
Joseph E. Papin

June 15, 1965  O. B. CRUSE  3,188,922
FRICTION DEVICE OPERATING MECHANISM
Filed Oct. 12, 1962  6 Sheets-Sheet 6

INVENTOR
OLIVER B. CRUSE

United States Patent Office 3,188,922
Patented June 15, 1965

3,188,922
FRICTION DEVICE OPERATING MECHANISM
Oliver B. Cruse, Florissant, Mo., assignor to Wagner Electric Corporation, St. Louis, Mo., a corporation of Delaware
Filed Oct. 12, 1962, Ser. No. 230,060
29 Claims. (Cl. 92—52)

This invention relates to friction device operating mechanisms and in particular to friction device operating mechanisms having emergency actuating means therein.

An object of the present invention is to provide a self-contained friction device operating mechanism for a vehicle pressure fluid system having service actuating means therein for fluid pressure friction device energizing purposes under normal operating conditions when the fluid pressure of said system is above a predetermined amount and emergency actuating means cooperatively arranged with said service actuating means for mechanical friction device energizing purposes under emergency conditions when the fluid pressure of said system is less than the predetermined amount.

Another object of the present invention is to provide a friction device operating mechanism having concentrically arranged relatively movable pistons therein for service and emergency friction device energizing purposes.

Another object of the present invention is to provide a self-contained friction device operating mechanism having concentrically arranged service and emergency pistons therein, said pistons being relatively movable for friction device energizing purposes under normal operating conditions and concertly movable for friction device energizing purposes under emergency conditions.

And still another object of the present invention is to provide a friction device operating mechanism having service and emergency friction device energizing means therein and means for limiting the friction device energizing force thereof.

These and other objects and advantages will become apparent hereinafter.

Briefly, the invention embodies resiliently mounted emergency means for energizing a friction device when fluid pressure applied thereto from a source of fluid pressure is less than a predetermined amount, and service means carried by said emergency means for energizing said friction device in response to fluid pressure metered thereto from said source. The invention also embodies emergency release means for overcoming the emergency function of the resiliently mounted emergency means when the fluid pressure of the source is less than the predetermined amount.

Figure 1:
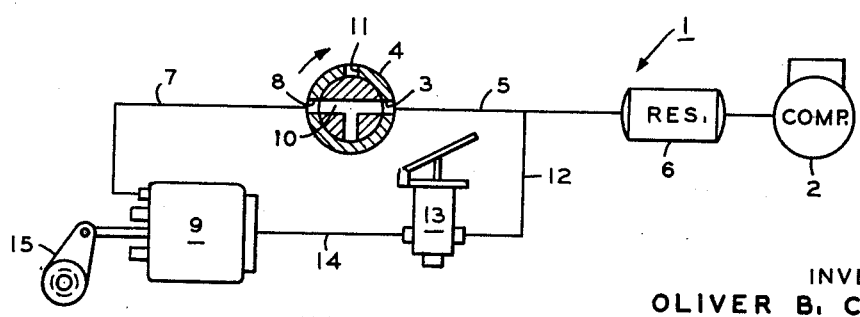
Figure 3:
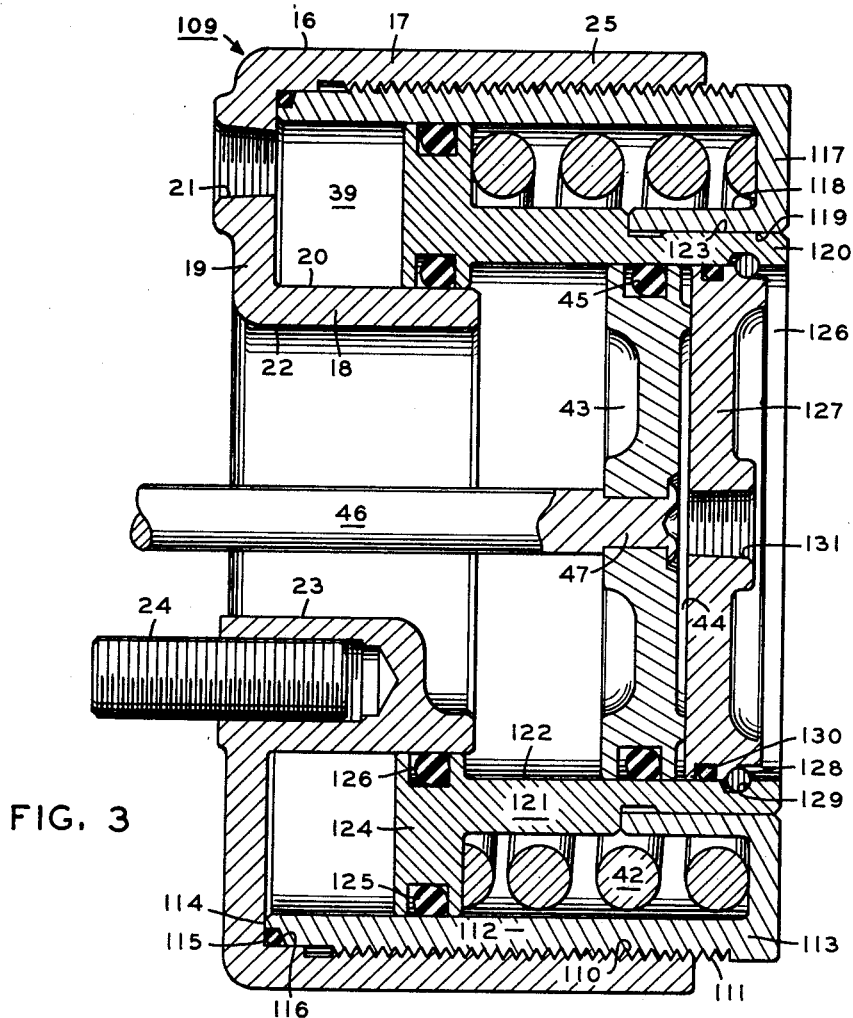
Figures 4, 5:
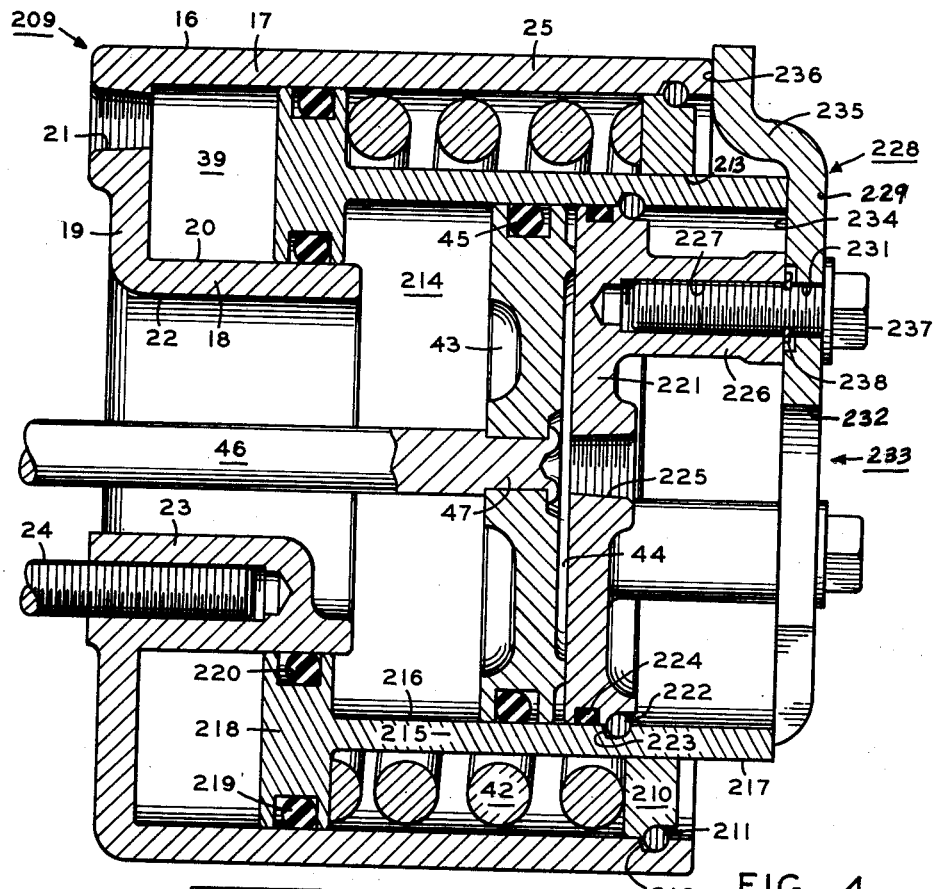
Figure 6:
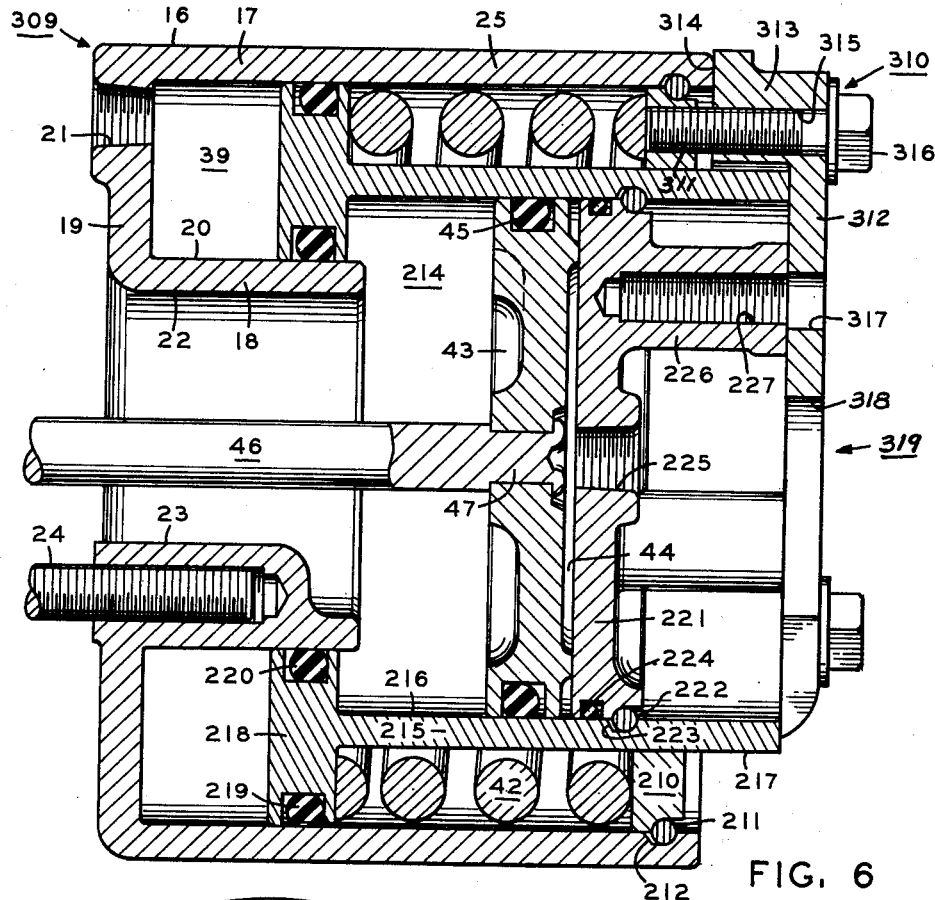
Figure 7:
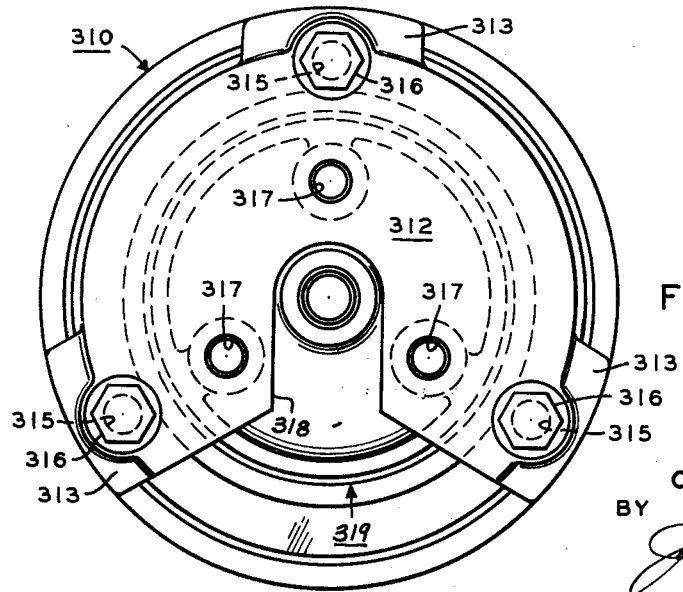
Figures 8, 9:
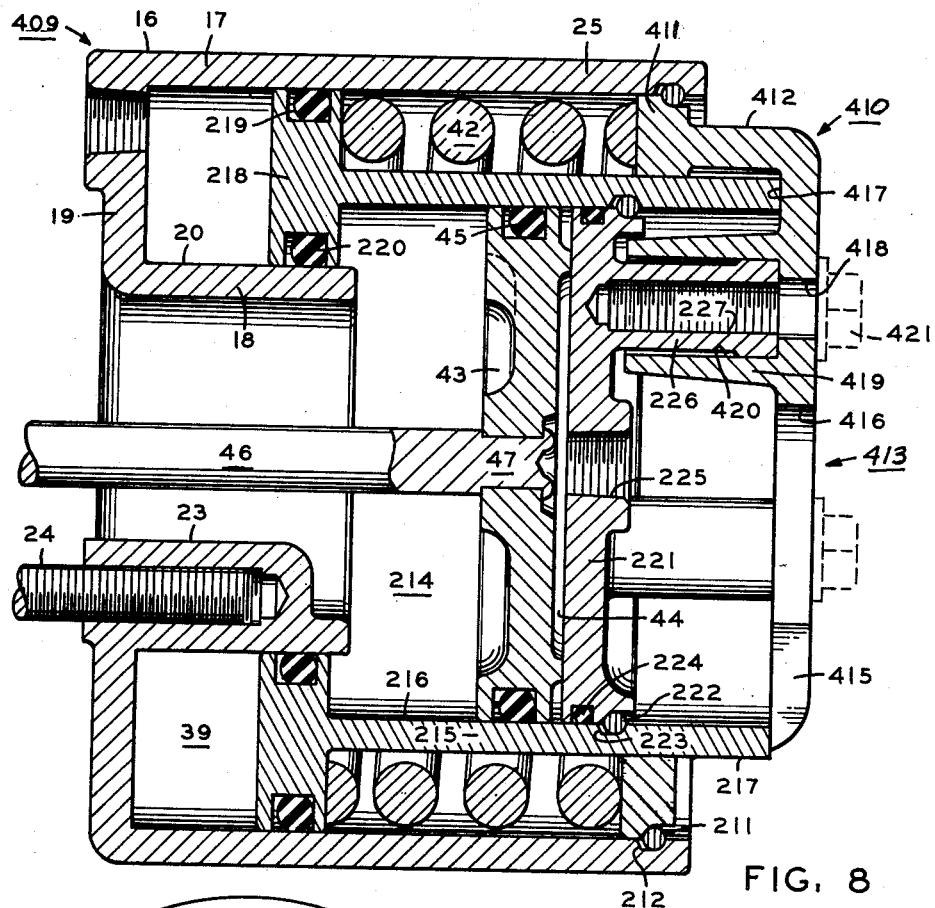
Figure 10:
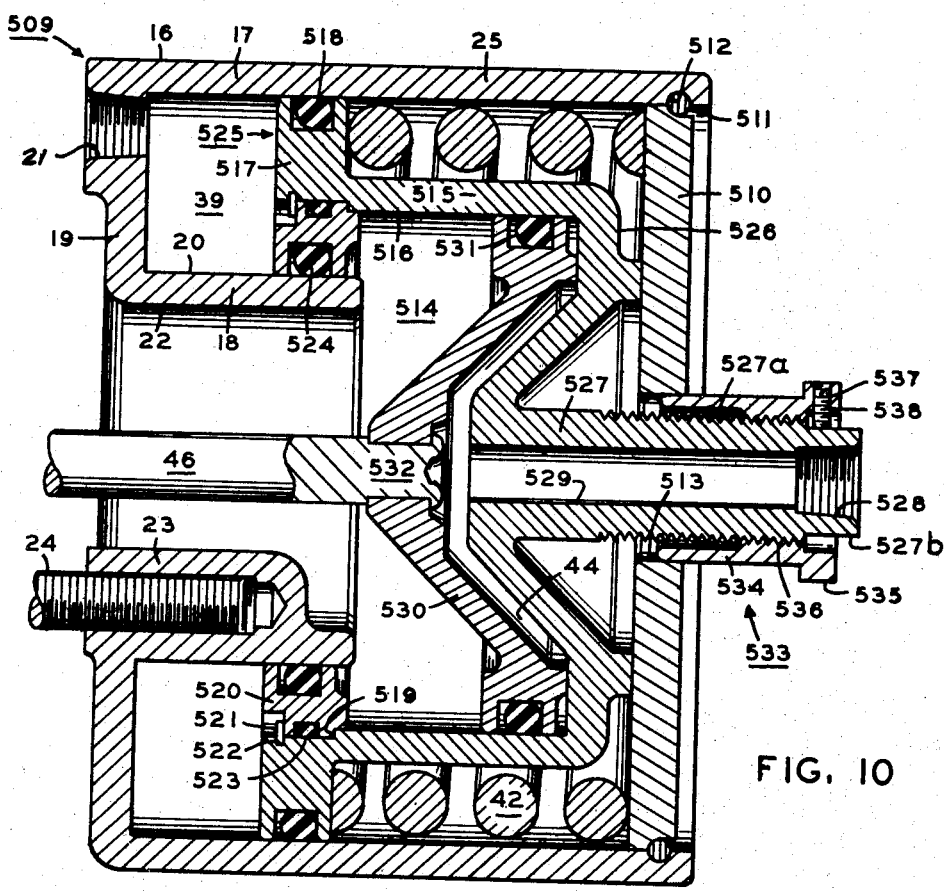
Figure 11:
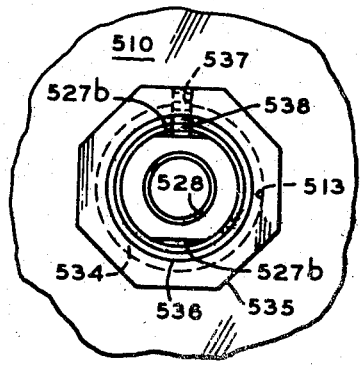

The invention also consists in the parts and arrangement of parts hereinafter described and claimed. In the accompanying drawings which form a part of the specification and wherein like numerals refer to like parts wherever they occur:

FIG. 1 is a diagrammatic view of an actuating system for a friction device showing a friction device operating mechanism embodying the present invention therein, FIG. 2 is a greatly enlarged cross-sectional view of the friction device operating mechanism shown in FIG. 1, FIG. 3 is a cross-sectional view of another friction device operating mechanism embodying the present invention, FIG. 4 is a cross-sectional view of another friction device operating mechanism embodying the present invention and showing disabling means therefor, FIG. 5 is a right-side elevational view of the friction device operating mechanism of FIG. 4, FIG. 6 is a cross-sectional view of another friction device operating mechanism embodying the present invention and showing disabling means therefor, FIG. 7 is a right-side elevational view of the friction device operating mechanism shown in FIG. 6, FIG. 8 is a cross-sectional view of another friction device operating mechanism embodying the present invention and showing disabling means therefor, FIG. 9 is a right-side elevational view of the friction device operating mechanism shown in FIG. 8, FIG. 10 is a cross-sectional view of another friction device operating mechanism embodying the present invention and showing disabling means therefor, and FIG. 11 is a fragmentary right-side elevational view of the friction device operating mechanism shown in FIG. 10.

Referring now to FIG. 1 in detail, a friction device actuating system indicated generally at 1, is provided with pressure generating means, such as compressor 2, which is connected to the inlet 3 of a charging or control valve 4 by a conduit 5. A fluid pressure storage reservoir 6 is interposed in the conduit 5 forming, in combination with the compressor 2, a source of fluid pressure, and another conduit 7 is interposed between an outlet 8 of the charging valve 4 and the emergency port of a friction device operating mechanism or actuating cylinder 9. The charging valve 4 is provided with rotatable passage means 10 connecting the inlet 3 in pressure fluid communication with the outlet 8; however, said rotatable passage means can be rotated clockwise (in the direction of the arrow) to a position interrupting communication between said inlet and outlet and establishing pressure fluid communication between said outlet and an exhaust port 11 to vent said outlet to atmosphere. A conduit 12 has one end intersecting with the conduit 5 and the other end thereof connecting with the inlet side of an application valve 13, and another conduit or service line 14 is interposed between the service or outlet side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

The actuating cylinder 9, FIG. 2, is provided with a housing or cylinder 16 having radially spaced, axially extending side walls 17 and 18 interconnected by an annular base wall 19 which worms an annular bore 20, and an emergency port 21 which receives the conduit 7, as previously mentioned, is provided in said base wall in open pressure fluid communication with said annular bore. The inner circumference of the side wall 18 forms an opening 22 through the leftward end of the housing 16, and a plurality of mounting hubs 23 are integrally provided on the inner circumference of said side wall to fixedly receive mounting studs 24. The side wall 17 is provided with an integral extension 25 which is internally threaded at 26 to cooperatively receive a threaded sleeve 27 of a housing or closure member 28. The sleeve 27 is provided with an annular abutment surface 29 on the leftward end thereof, and a radially inwardly extending end wall 30 is integrally formed with said sleeve adjacent the rightward end thereof. An annular axially extending flange 30a is integrally formed with said end wall 30 forming a bore 31 axially through said closure member 28.

A power or emergency piston 32 consists of a cylinder portion or sleeve extension 33 having a bore 34 therein and a peripheral surface 35. The cylinder 33 is provided with an integral, radially outwardly extending piston head 36 on the leftward end thereof, and a radially inwardly extending bore end wall 37 is integrally formed with said cylinder adjacent the rightward end thereof. A service port 38 which receives the conduit 14, as previously mentioned, is provided in the bore end wall 37 in pressure fluid communication with the cylinder bore 34. The cylinder bore 34 is slidably received by the housing side wall 18, and the peripheral portion of the piston head 36 is slidably received by the housing side wall 17 so that an expansible emergency chamber 39 is formed in the annular housing bore 30 between the housing base wall 19 and the piston head 36 in open communication with the emergency port 21. O-ring seals 40 and 41 are carried in the outer and inner peripheral portions of the piston head 36 in sealing engagement with th housing side walls 17 and 18, respectively. The peripheral surface 35 of the cylinder 33 is slidably received in the closure member bore 31, and an emergency spring 42 is biased between the closure member end wall 30 and the piston head 36 being in radial spaced relation with the cylinder peripheral surface 35 and the closure member sleeve 27.

A service piston 43 is slidably received in the cylinder bore 34 and normally positioned in abutting engagement with the bore end wall 37, and an expansible service chamber 44 is formed in said cylinder bore between said service piston and bore end wall in open presure fluid communication with the service port 38. An O-ring seal 45 is carried in the peripheral portion of the service piston 43 in sealing engagement with the cylinder bore 34, and a push rod 46 extends through the housing opening 22 and cylinder bore 34 having one end connected with the service piston 43 at 47 and the other end thereof pivotally connected with the slack adjuster 15, as previously mentioned. While the push rod 46 is shown fixedly connected at 47 with the service piston 43, it is a well-known expediency to provide a pivotal connection at 47 between said push rod and service piston.

In the operation, assume that normal operating conditions exist wherein the storage reservoir 6 is charged with fluid presure above a predetermined amount from the compressor 2, and said reservoir 6 is connected in fluid pressure communication with the emergency chamber 39 through the emergency port 21, the conduit 7, the outlet 8, passage means 10 and inlet 3 of the control valve 4, and the conduit 5. The fluid pressure so transmitted to the emergency chamber 39 acts on the effective area of the emergency piston head 36 creating a force to normally position said emergency piston head in abutting engagement with the abutment surface 29 on the closure member sleeve 27 and normally maintain the emergency piston 32 in its inoperative position against the compressive force of the emergency spring 42. With the component parts of the system 1 and actuating cylinder 9 positioned as above described and as shown in FIGS. 1 and 2, the friction device (not shown) is de-energized.

If the operator desires to initiate a normal service application to energize the friction device and effect deceleration or a complete stop, a manual force applied on the application valve 13 meters fluid pressure from the reservoir 6 through conduits 5 and 12, said application valve, the service line 14, and the service port 38 of the actuating cylinder 9 into the service chamber 44. The fluid pressure so established in the service chamber 44 acts on the effective area of the service piston 43 creating a service force to move said service piston and push rod 46 leftwardly to actuate the slack adjuster 15 and energize the friction device. When the applied manual force is removed from the application valve 13, the fluid pressure is exhausted to atmosphere from the service chamber 44 through the service port 38, the conduit 14, and the exhaust port of said application valve to eliminate the service force, and the spring forces of the friction device are utilized to move the slack adjuster 15, push rod 46 and service piston 43 to their original position. Such utilization of the friction device spring forces is a common expediency in the art instead of providing a separate return spring for the service piston 43.

In an emergency condition when the fluid pressure in the reservoir 6 is reduced below the predetermined amount due to leaks in the system 1 or a non-producing compressor 2, or the like, the fluid pressure in the emergency chamber 39 is correspondingly reduced thereby reducing the emergency force opposing the compressive force of the spring 42. When the magnitude of the spring force overcomes that of the reduced emergency force, the spring 42 moves the emergency piston 32 leftwardly in a work-producing direction wherein the emergency piston head 36 is moved in the housing bore 20 toward an operative position in abutting engagement with the housing base wall 19. Since the service piston 43 is abuttingly engaged with the bore end wall 37 of the emergency piston 32, said service piston is moved leftwardly in concert with said emergency piston to actuate the push rod 46 and slack adjuster 15 and mechanically energize the friction device.

When the friction device is mechanically energized under emergency conditions, the operator may also initiate a normal service application, as above described, if desired; however, the service force so established to actuate the service piston 43 is, in effect, absorbed or cancelled since the fluid pressure metered to the service chamber 44 also acts on the effective area of the bore end wall 37 of the emergency piston 32 creating a substantially equal and opposite reaction force. The reaction force serves to move the emergency piston 32 rightwardly against the compressive force of the spring 42 thereby preventing compounding of the spring and service forces. In view of the above, it is obvious that the compression of the emergency spring 42 in response to rightward movement of the emergency piston 32 by the reaction force substantially absorbs or cancels the service force and limits the maximum friction device energizing force by preventing the compounding of the service and spring forces, which compounding of forces would serve to bend or fracture some component parts of the actuating cylinder 9, linkage 15, or friction device.

When the fluid pressure failure in the system 1 has been corrected and the fluid pressure is increased above the predetermined amount wherein normal operating conditions are now re-established, the fluid pressure in the emergency chamber 39 of the actuating cylinder 9 is correspondingly increased to re-establish the magnitude of the emergency force. When the magnitude of the emergency force overcomes that of the compressive force of the spring 42, the emergency piston 32 is moved rightwardly against said spring toward its inoperative position, and as previously mentioned, the spring forces of the friction device effect concert movement of the service piston 43 with said emergency piston toward its inoperative position thereby de-energizing said friction device.

If the operator desires to "dynamite" the system 1 to initiate the emergency function of the actuating cylinder 9, the rotatable passage means 10 of the charging valve 4 is rotated in a clockwise direction (as shown by the arrow in FIG. 1) to a position aligned between the outlet 8 and the exhaust port 11 of said charging valve to vent the emergency chamber 39 to atmosphere. With the emergency chamber 39 vented to atmosphere, the emergency function of the actuating cylinder 9 is initiated by the emergency spring 42, as described hereinbefore, to mechanically energize the friction device.

In order to service the various component parts in the actuating cylinder 9, said actuating cylinder is "dynamited," as previously described, to effect partial extension of the spring 42. The closure member 28 is then threadedly disengaged from the housing extension 25, and the spring 42 extends to its free length before said closure member is completely disengaged from said housing extension. The free length extension of the spring 42 prior to disengagement of the closure member 28 and housing extension 25 obviates the possibility of the compressive force of said spring propelling said closure member with great force from said housing extension which could seriously injure the person servicing the actuating cylinder. Subsequent to the removal of the closure member 28, the spring 42 and emergency piston 32 can be removed through the now open end of the housing extension 25 thereby permitting access to the O-ring seals 40, 41, and 45 for replacement purposes. Re-assembly is accomplished by merely sliding the cylinder bore 34 of the emergency piston 32 over the service piston 43 and slidably engaging the emergency piston head 36 in the annular housing bore 20, inserting the spring 42 into position, and threadedly re-engaging the closure member 28 with the housing extension 25. It should be noted that assembly and disassembly can be easily accomplished while the actuating cylinder 9 is mounted on the vehicle or removed therefrom without the aid of presses or the like and special jigs or fixtures to overcome the compressive force of the emergency spring 42.

Referring now to FIG. 3, a friction device operating mechanism or actuating cylinder 109 is shown having substantially the same component parts and functioning in the system 1 in substantially the same manner as the previously described actuating cylinder 9 with the following exceptions. The side wall 17 and extension 25 are provided with an internally threaded portion 110 which is engaged with a threaded peripheral surface 111 on an annular sleeve 112 of a housing or closure member 113. An annular abutment surface 114 is provided on the leftward end of the sleeve 112 normally in abutting engagement with the housing base wall 19, and an O-ring seal 115 is carried in an annular recess 116 adjacent to the leftward end of said sleeve in sealing engagement with the side wall 17. The closure member 113 is provided with a radially inwardly extending end wall 117 integrally formed with the sleeve 112 adjacent the rightward end thereof, and an annular axially extending flange 118 is integrally provided on said end wall 117 forming an axial opening or bore 119 through said end wall.

A power or emergency piston 120 consists of a cylinder portion or sleeve extension 121 having a bore 122 therein and a peripheral surface 123, and a radially outwardly extending annular piston head 124 is integrally provided on the leftward end of the cylinder 121. The radially outer and the peripheral portions of the annular piston head 124 are positioned in sliding engagement with the closure member sleeve 112 and the housing side wall 18, respectively, so that the expansible emergency chamber 39 is formed in the annular housing bore 20 between the housing base wall 19 and said piston head in open pressure fluid communication with the emergency port 21. O-ring seals 125 and 126 are carried in the outer and inner peripheral portions of the piston head 124 in sealing engagement with the closure member sleeve 112 and the housing side wall 18, respectively, and the peripheral surface 123 of the cylinder 121 is slidably positioned in the opening 119 of the closure member flange 118. The emergency spring 42 has one end biased into engagement with the end wall 117 of the closure member 113 and the other end thereof biased into engagement with the piston head 124 normally urging said piston head toward engagement with the housing base wall 19 and urging the emergency piston 120 toward a protractile or operative position. A bore end wall member 127 is slidably received in the cylinder bore 122 and retained against displacement therefrom by a split snap ring 128 positioned in an annular recess 129 provided adjacent the rightward end of said cylinder bore. The bore end wall member 128 carries an O-ring seal 130 in the peripheral portion thereof in sealing engagement with the cylinder bore 122, and a centrally located service port 131, which receives the service conduit 14, is provided in said bore end wall member in open pressure fluid communication with the service chamber 44 formed in said cylinder bore between said bore end wall member and the service piston 43 slidable in said cylinder bore.

Referring now to FIGS. 4 and 5, another friction device operating mechanism or actuating cylinder 209 is shown having substantially the same component parts and functioning in the system 1 in substantially the same manner as the previously described actuating cylinders 9 and 109 with the following exceptions. A closure member 210 is slidably received in the annular side wall extension 25 and normally retained against displacement therefrom by a retaining ring 211 positioned in an annular groove 212 adjacent the rightward or free end of said side wall extension. An axial opening 213 is provided through said closure member 210.

A power or emergency piston 214 consists of a cylinder portion or sleeve extension 215 having a bore 216 therein and a peripheral surface 217, and a radially outwardly extending annular piston head 218 is integrally provided on the leftward end of the cylinder 215. The outer and inner peripheral portions of the annular piston head 218 are positioned in sliding engagement with the housing side walls 17 and 18, respectively, so that the expansible emergency chamber 39 is formed in the annular housing bore 20 between the housing base wall 19 and said piston head in open pressure fluid communication with the emergency port 21. O-ring seals 219 and 220 are carried in the inner and outer peripheral portions of the piston head 218 in sealing engagement with the housing side walls 17 and 18, respectively, and the peripheral surface 217 of the cylinder 215 is slidably positioned in the opening 213 of the closure member 210. The emergency spring 42 has one end biased into engagement with the closure member 210 and the other end thereof biased into engagement with the piston head 218 normally urging said piston head toward engagement with the housing base wall 19 and urging the emergency piston 214 toward a protractile or operative position.

A bore end wall member 221 is slidably received in the cylinder bore 216 and retained against displacement therefrom by a split snap or retaining ring 222 positioned in an annular recess 223 provided adjacent the rightward end of said cylinder bore. The bore end wall member 221 carries an O-ring seal 224 in the peripheral portion thereof in sealing engagement with the cylinder bore 216, and a centrally located service port 225, which receives the service conduit 14, is provided in said bore end wall member in open pressure fluid communication with the service chamber 44 formed in said cylinder bore between said bore end wall member and the service piston 43 slidable in said cylinder bore. The bore end wall member 221 is also provided with a plurality of integral axially extending hubs 226 having a threaded bore 227 therein for emergency release purposes, as described hereinafter.

When the emergency function of the actuating cylinder 209 is initiated due to fluid pressure failure in the system 1, said actuating cylinder will mechanically energize the friction device under emergency conditions to effect an emergency vehicle stop, as previously described. Often such emergency vehicle stops occur at inopportune times and place the vehicle in a dangerous position with regard to other vehicles on the road; therefore, after such emergency stops occur, it is advantageous and desirable to be able to move the vehicle to a less dangerous position to correct the failure in the system 1 and/or actuating cylinder 209 and subsequently re-establish normal operating conditions. To this end, emergency release means, indicated generally at 228, are provided to retractively move the emergency piston 214 to its retracted or inoperative position to de-energize the friction device under emergency conditions, as described hereinafter.

Emergency release or disabling means 228 are not normally connected with or carried by the actuating cylinder 209, and said emergency release means include a body member 229 having a plurality of radially extending arms 230 with stud apertures or openings 231 therein which are predeterminately aligned with the threaded bores 227 in the hubs 226 on the bore end wall member 221. A yoke-shaped opening 232 is also provided in the body member 229 in predetermined alignment with the service port 225 in the bore end wall member 221 to obviate interference of said body member with the service conduit 14 connected with said service port. Two of the arms 230 are formed with the yoke opening 232 to provide an access opening, indicated generally at 233, for tool insertion purposes. Each of the arms 230 are provided with an abutment surface 234 for engagement with the rightward or free end of the emergency piston 214, and the distal portion of each of said arms is bent at 235 to provide abutment surfaces 236 for abutting engagement with the free end of the housing side wall extension 25. Studs 237 are positioned in each of the stud openings 231 and are rotatably retained therein against displacement by a snap ring 238 secured to said studs.

When the aforementioned emergency vehicle stop occurs, under emergency operating conditions, the operator positions the body member 229 on the actuating cylinder 209 so that the studs 237 are aligned with the cooperating threaded bore 227 in the hubs 226 of the bore end wall member 221 and then threadedly engages said studs in said bores thus moving the abutment surfaces 236 on the body member arms 230 into abutting engagement with the free end of the housing side wall extension 25. Further threaded engagement of the studs 237 and threaded bores 227 effects rightward or retractile movement of the emergency piston 214 from its protracted or operative position toward its retracted or inoperative position against the compressive force of the emergency spring 42. In this manner, the friction device is deenergized when the emergency piston 214 and parts associated therewith are retractively moved to their original inoperative positions by emergency release means 228 since, as previously mentioned, the friction device spring forces serve to maintain the service piston 43 in abutment with the bore end wall member 221 effecting concert movement of said service piston to its retracted or inoperative position along with the retractile movement of said emergency piston. With the emergency piston 214 and spring 42 so retained by emergency release means 228, the operator may now utilize whatever fluid pressure is in the system 1 to make a normal service application, as previously described, to control the friction device and move the vehicle to a more advantageous and less dangerous position to correct the fluid pressure failure.

When the fluid pressure failure in the system 1 has been corrected and the fluid pressure is increased above the predetermined amount wherein normal operating conditions are re-established, the operator merely threadedly disengages the studs 237 from the hub bores 227 to remove the body member 229 from engagement with the actuating cylinder 209, and said actuating cylinder can function under normal operating conditions.

Another friction device operating mechanism or actuating cylinder 309 is shown in FIGS. 6 and 7 along with emergency release or disabling means 310 therefor having substantially the same component parts and functioning in substantially the same manner in the system 1 as the previously described actuating cylinders 9, 109, 209 and emergency release means 238 with the following exceptions. Emergency release means 310 is normally carried by the actuating cylinder 309 in which the closure member 210 thereof is provided with a plurality of threaded stud receiving apertures 311. Emergency release means 310 includes a dish-shaped body member 312 having a plurality of integral axial extensions 313 adjacent the periphery thereof, and said extensions are provided with abutment surfaces 314 which normally engage the free end of the housing side wall extension 25 and stud receiving openings or apertures 315 which are predeterminately aligned with the threaded stud receiving apertures 311 in the actuating cylinder closure member 210. A plurality of studs 316 are normally received through the body member 312 fixedly attached to the actuating cylinder 209. Other stud receiving apertures 317 are provided in the body member 312 radially inwardly of the apertures 315 in predetermined alignment with the threaded bores 227 in the hubs 226 of the bore end wall member 221. A yoke-shaped opening 318 is also provided in the body member 312 in predetermined alignment with the service port 225 to accommodate the service conduit 14 and prevent interference of said body member with service conduit, said yoke-shaped opening forming with said body member an access opening, indicated generally at 319, for tool insertion purposes.

When an emergency vehicle stop occurs under emergency operating conditions, as previously described, the operator merely removes the studs 316 from their normal position in threaded engagement with the closure member threaded apertures 311 and positions the body member 312 so that the apertures 317 thereof are aligned with the threaded bores 227 in the hubs 226 of the bore end wall member 221. The studs 316 are then inserted through the apertures 317 into threaded engagement with the hub bores 227 thus repositioning the abutment surface 314 on the body member 312 in abutting engagement with the free end of the housing side wall extension 25. Further threaded engagement of the studs 316 and hub bores 227 effects rightward or retractile movement of the emergency piston 214 from its protracted or operative position toward its retracted or inoperative position against the compressive force of the emergency spring 42 to de-energize the friction device under emergency operating conditions in the same manner as previously described.

When the fluid pressure failure in the system 1 has been corrected and the fluid pressure is increased above the predetermined amount wherein normal operating conditions are re-established, the operator can remove the studs 316 from threaded engagement with the hub bores 227 and threadedly re-engage said studs with the apertures 311 in the closure member 310. In this manner, the body member 312 is returned to its normal position, and the actuating cylinder 309 can function under normal operating conditions.

Referring now to FIGS. 8 and 9, another friction device operating mechanism or actuating cylinder 409 is shown along with emergency release or disabling means 410 therefor having substantially the same component parts and functioning in the system 1 in substantially the same manner as the previously described actuating cylinders 9, 109, 209, 309 and emergency release means 228, 310 with the following exceptions. The actuating cylinder 409 is provided with a closure member 411 which is slidably received in the annular housing side wall extension 25 and retained therein against displacement in response to the force of the emergency spring 42 by the snap ring 211 positioned in the groove 212. Emergency release means, indicated generally at 410, is provided with a partial dish-shaped body member 412 which is integrally formed with the closure member 411. An access opening, indicated generally at 413, is formed by the marginal edges 414 and 415 of the body member 412 for tool insertion purposes, and a yoke-shaped opening 416 connects with said access opening in predetermined alignment with the service port 225 to accommodate the service conduit 14 and prevent interference of said body member with said service conduit. The body member 412 is provided with an annular abutment surface or stop 417 for abutment with the rightward or free end of the emergency piston 214 in its retracted or inoperative position, as shown in FIG. 8, and a plurality of stud receiving openings or apertures 418 are axially provided in said abutment member in predetermined alignment with the threaded bores 227 in the hubs 226 of the bore end wall member 221. An integral guide extension 419 is provided on the body member 412 having an axial bore 420 therein connecting with one of the stud receiving apertures 418, and one of the hubs 226 on the bore end wall member 221 is slidably guidingly received in the bore 420. The sliding and guiding engagement of the hub 226 in the extension bore 420 of the body member 412 prevents rotation of the bore end wall member 221 in the emergency piston bore 216 to maintain the predetermined alignment between the stud receiving apertures 418 in said body member and the threaded bores 227 in the hubs 226. Studs 421 are shown in phantom outline in FIGS. 8 and 9 since they are not normally connected with or carried by the actuating cylinder 409.

When an emergency vehicle stop occurs under emergency operating conditions, as previously described, the operator merely inserts the studs 421 through the stud receiving apertures 418 into threaded engagement with the threaded hub bores 227. Further threaded engagement of the studs 421 and hub bores 227 effects rightward or retractile movement of the emergency piston 214 from its protracted or operative position against the compressive force of the emergency spring 42 to de-energize the friction device under emergency operating conditions in the same manner as previously described.

When the fluid pressure failure in the system 1 has been corrected and the fluid pressure is increased above the predetermined amount wherein normal operating conditions are re-established, the operator merely removes the studs 421 from threaded engagement with the hub bores 227, and the actuating cylinder 409 can function under normal operating conditions.

Referring now to FIGS. 10 and 11, a friction device operating mechanism or actuating cylinder 509 is shown having substantially the same component parts and functioning in the system 1 in substantially the same manner as the previously described actuating cylinders 9, 109, 209, 309, 409 with the following exceptions. The actuating cylinder 509 is provided with a closure member 510 which is slidably received in the annular side wall extension 25 and normally retained therein against the displacement force of the return spring 42 by a split snap or retaining ring 511 positioned in an annular groove 512 adjacent the rightward or free end of said side wall extension. A centrally located opening or bore 513 is provided through the closure member 510.

A power or emergency piston 514 is provided with a cylindrical portion or wall 515 having an axial bore 516 therein. A radially outwardly extending flange 517 is integrally formed with the cylinder wall 515 adjacent the leftward end thereof, and an O-ring seal 518 is carried in the outer peripheral portion of said flange in sealing engagement with the housing side wall 17. An annular axially extending recess 519 is provided in the leftward end of the cylinder wall 515, and an annular piston 520 is retained in said recess by a split retaining ring 521 positioned in an annular groove 522 provided in the side wall of said recess. O-ring seals 523 and 524 are carried in the outer and inner periphery of the piston 520 in sealing engagement with the side wall of the recess 519 and the housing side wall 18, respectively; therefore, the flange 517 and piston 520 are interconnected to form a split piston head, indicated generally at 525, and the emergency chamber 39 is formed in the annular housing bore 20 between the housing end wall 19 and the piston head 525 in open pressure fluid communication with the emergency port 21. A radially inwardly extending base wall 526 is integrally formed with the cylinder wall 515 and provided with a centrally located, axial, cylindrical extension 527 which protrudes coaxially through the closure member bore 513. The cylindrical extension 527 is provided with a threaded peripheral portion 527a and a hexagonally shaped free end portion 527b. A service port 528, which receives the service conduit 14, is provided in the rightward end of the cylindrical extension 527, and an axial passage 529 in said cylindrical extension has one end connecting with said service port and the other end thereof connecting with the service chamber 44. The service chamber 44 is formed in the cylinder bore 516 between the cylinder end wall 526 and a service piston 530 slidable in said cylinder bore. The service piston 530 carries an O-ring seal 531 in the peripheral portion thereof in sealing engagement with the cylinder bore 516, and the push rod 46 is connected with said service piston at the central portion thereof indicated at 532. The emergency spring 42 has one end biasing the closure member 510 into abutment with the retaining ring 511 and the other end thereof biased into engagement with the piston head 525 normally urging said piston head toward engagement with the housing end wall 19 and urging the emergency piston 514 toward a protracted or operative position.

Emergency release or disabling means, indicated generally at 533, consists of a cylindrical sleeve 534 slidably and rotatably received in the closure member bore 513 and having a hexagonally-shaped head portion 535 integrally formed on the rightward end thereof. A threaded bore 536 is axially provided through the sleeve 534 and is cooperatively engaged with the threaded peripheral surface 527a on the cylindrical extension 527. A threaded cross-passage 537 in the head 535 intersects with the bore 536, and a set screw 538 is carried in said cross-passage 537 in abutting engagement with the hexagonally-shaped free end 527b of the cylindrical extension 527 to normally prevent rotation of the sleeve 534 relative to said cylindrical extension.

When an emergency vehicle stop occurs under emergency operating conditions, as previously described, the operator merely moves the set screw 538 out of abutting engagement with the cylindrical extension free end 527b and applies a force on the sleeve head 535 to rotate the sleeve 534. The threaded engagement between the sleeve 534 and cylindrical extension 527 effects leftward movement of said sleeve until the sleeve head 535 engages the closure member 510. With the sleeve head 535 engaged with the closure member 510, further threaded engagement between the sleeve 534 and cylindrical extension effects rightward movement of the emergency piston 514 from its protracted or operative position to its retracted or inoperative position against the compressive force of the emergency spring 42 to de-energize the friction device under emergency operating conditions.

When the fluid pressure failure of the system 1 has been corrected and the fluid pressure is increased above the predetermined amount wherein normal operating conditions are re-established in said system, the operator merely rotates the sleeve 534 to its original position on the cylindrical extension 527 re-engages the set screw 538 with the cylindrical extension free end 527b wherein the actuating cylinder 509 can again function under normal operating conditions.

It is now apparent that novel friction device operating mechanisms or actuating cylinders meeting the objects set out hereinbfeore are provided and that changes or modifications to the precise configurations, shapes, or details of the constructions set forth in the disclosure by way of illustration may be made by those skilled in the art without departing from the spirit of the invention as defined by the claims which follow.

What I claim is:

1. A friction device operating mechanism comprising an expansible chamber, resiliently urged means opposing expansion of said chamber, another expansible chamber in said resiliently urged means, actuator means opposing expansion of said other chamber and having a working end thereon, means for introducing fluid pressure into said other chamber, said actuator means being movable in a working direction in response to fluid pressure in said other chamber to energize the working end thereof, and other means for introducing fluid pressure into said first named chamber, said resiliently urged means urging said actuator means in a working direction to energize the working end thereof when the fluid pressure in said first named chamber is less than a predetermined amount.

2. A friction device operating mechanism comprising an expansible chamber, means including spring means opposing expansion of said chamber, another expansible chamber in said first named means, and actuator means opposing expansion of said other chamber and having a working end thereon, said spring means being extendable to concertly urge said first named means and actuator means in a working direction to energize the working end of said actuator means when the fluid pressure in said first named chamber is less than a predetermined amount, and said first named means being movable relative to said actuator means and against said spring means in response to fluid pressure in said other chamber to predeterminately limit the extent of the energization of the working end.

3. A friction device operating mechanism comprising a cylinder having an expansible chamber therein, a pair of piston means, one of said piston means forming a wall of said chamber, spring means urging said one piston means in a working direction to oppose expansion of said chamber, another expansible chamber in said one piston means, the other of said piston means forming a wall of said other chamber and having a working end thereon, means for introducing fluid pressure into said other chamber, said other piston means being movable in response to the fluid pressure in said other chamber to energize said working end, and means for introducing fluid pressure into said first named chamber, said one piston means being movable in response to the compressive force of said spring means to urge said other piston means in the working direction and energize said working end when the fluid pressure in said first named chamber is less than a predetermined amount.

4. A friction device operating mechanism comprising a cylinder, a pair of piston means, one of said piston means being slidable in said cylinder and having a bore therein, an expansible chamber in said cylinder on one side of said one piston means, the other of said piston means being slidable in said bore, another expansible chamber in said bore between said piston means, spring means engaged with the other side of said one piston means, a working end on said other piston means and extending exteriorly of said cylinder, means for introducing fluid pressure into said first named chamber, said one piston means being movable against said spring means in response to fluid pressure in said first named chamber above a predetermined amount, means for introducing fluid pressure into said other chamber, said other piston means being movable in response to fluid pressure in said other chamber to energize said working end, and said spring means being extendable to move said one piston means into engagement with said other piston means and mechanically energize said working end when the fluid pressure in said first named chamber is less than the predetermined amount.

5. A friction device operating mechanism comprising a housing having an annular bore therein, first piston means slidable in said annular housing bore and including a cylindrical portion having a bore therein, wall means closing one end of said bore and connected with said cylindrical portion, second piston means slidable in said cylindrical portion bore and having a working end extending exteriorly of said housing, first and second fluid pressure ports in said housing and wall means connecting with said housing bore and cylindrical portion bore, respectively, said first and second piston means being relatively movable in response to fluid pressure at said second port to energize said working end, and spring means engaged with said first piston means, said first and second piston means being concertly movable in response to the compressive force of said spring means to energize said working end when the fluid pressure at said first port is less than a predetermined amount.

6. A friction device operating mechanism comprising a housing having radially spaced inner and outer side walls interconnected by a base wall and forming an annular bore, a first axial opening in said housing defined by said inner side wall, a cylindrical extension integral with said outer side wall, a closure member connected with said integral extension, a second axial opening in said closure member, first piston means including a cylindrical portion slidable in said second axial opening and having a bore therein, an annular piston head connected to said cylindrical portion and slidable in said annular housing bore, wall means connected to said cylindrical portion and closing one end of said cylindrical portion bore, second piston means slidable in said cylindrical portion bore and normally engaged with said wall means, a push rod extending through said first axial opening, said push rod having an interior end connected with said second piston means and a working end exteriorly of said housing, first and second fluid pressure ports in said housing base wall and said wall means connecting in open fluid pressure communication with said annular housing bore and said cylindrical portion bore, respectively, said second piston means being movable in response to fluid pressure at said second fluid pressure port to actuate said push rod and energize the working end thereof, spring means interposed between said piston head and said closure member and normally urging said first piston means in a working direction, said second piston means being concertly movable with said first piston means in the working direction in response to the compressive force of said spring means to actuate said push rod and energize the working end thereof when the fluid pressure at said first fluid pressure port is less than a predetermined amount.

7. A friction device operating mechanism comprising a housing having a pair of radially spaced side walls interconnected by an end wall, first piston means including a sleeve portion having a base wall connected thereto, a bore in said sleeve portion, an annular flange connected with said sleeve portion and slidably engaged with one of said housing side walls, an annular sealing member secured to said sleeve portion and slidably engaged with the other of said housing side walls, said flange and sealing member forming a piston head portion and defining with said housing end wall an expansible chamber between said side walls, a closure member connected with said one side wall, second piston means slidable in said bore and having a working end extending exteriorly of said housing, another expansible chamber in said bore between said second piston means and said base wall, means for introducing fluid pressure into said other chamber, said second piston means being movable in response to fluid pressure in said other chamber toward an operative position to energize the working end thereof, means for introducing fluid pressure into said first named chamber, and spring means interposed between said piston head portion and closure member and opposing expansion of said first named chamber, said spring means urging said first piston means toward an operative position when the fluid pressure in said first named chamber is less than a predetermined amount, and said first piston means being engageable with said second piston means to urge said second piston means toward an operative position and energize the working end thereof.

8. A friction device operating mechanism comprising a housing, resiliently urged means movable in said housing and defining therewith an expansible fluid pressure chamber, and other means having a working end thereon and being movable in said resiliently urged means to define therewith another expansible fluid pressure chamber, said other means being movable toward an operative position in response to fluid pressure in said other chamber to actuate said working end and said resiliently urged means being movable in response to fluid pressure in said first named chamber less than a predetermined value to mechanically urge said other means toward the operative position thereof and actuate said working end.

9. The friction device operating mechanism according to claim 8 including a pair of spaced abutments on said housing for engagement with said resiliently urged means to limit movement thereof in one direction to actuate said working end and in a direction opposite to said one direction.

10. The friction device operating mechanism according to claim 8 wherein said housing comprises a pair of releasably engaged separable housing portions, said resiliently urged means exerting forces on said housing portions in separating directions, and said housing portions being manually disengaged to effect separation thereof and substantially dissipate the force of said resiliently urged means prior to the disengagement.

11. The friction device operating mechanism according to claim 8 wherein said housing comprises a pair of releasably engaged separable housing portions, said first named chamber being in one of said housing portions, said resiliently urged means being engaged with the other of said housing portions and opposing fluid pressure expansion of said first named chamber wherein the resilient force thereof normally urges said housings in separating directions, and said housing portions being manually separable to effect disengagement and substantially dissipate the resilient force of said resiliently urged means prior to the disengagement of said housing portions.

12. The friction device operating mechanism according to claim 8 wherein said housing comprises a pair of releasably engaged separable housing portions, said first named chamber being in one of said housing portions, said resiliently urged means being engaged between said housing portions to exert forces thereon in separating directions when the fluid pressure in said first named chamber is less than the predetermined value, and means providing for movement of said housing portions in separating directions to effect disengagement therebetween and substantially dissipate the force of said resiliently urged means prior to the disengagement of said housing portions.

13. The friction device operating mechanism according to claim 8 wherein said housing comprises a pair of releasably engaged separable housing portions, said first named chamber being in one of said housing portions, said resiliently urged means including piston means movable in said first named chamber, and spring means exerting a force on said piston means in one direction to oppose fluid pressure expansion of said first named chamber and a force in the opposite direction on the other of said housings, said spring means being extendable to move said piston means to a position reducing the size of said first named chamber when the fluid pressure therein is less than the predetermined value wherein the forces in the one and opposite directions are partially dissipated, and means defining a threaded connection between said housing portions providing relative movement of said housing portions in a separating direction in response to an applied force to effect disengagement of said housing portions and substantially free length extension of said spring means to substantially dissipate the forces thereof in the one and opposite directions upon the disengagement of said housing portions.

14. The friction device operating mechanism according to claim 12 wherein said last named means comprises a threaded connection between said housing portions.

15. The friction device operating mechanism according to claim 8 wherein said housing comprises a pair of threadedly engaged housing portions adapted for separation in response to an applied force, said resiliently urged means exerting a force effective to separate said housing portions, and said housing portions being threadedly moved in a separating direction toward disengagement in response to the applied force to substantially dissipate the force of said resiliently urged means prior to the disengagement of said housing portions.

16. A friction device operating mechanism comprising a housing, resiliently urged means movable in said housing between working and inoperative positions and defining therewith an expansible fluid pressure chamber, said resiliently urged means being movable to the inoperative position thereof in response to fluid pressure in said first named chamber in excess of a predetermined value, other means adapted for relative movement in said resiliently urged means between working and inoperative positions and defining therewith another expansible fluid pressure chamber, said other means being movable relative to said resiliently urged means from the inoperative position to the working position thereof in response to fluid pressure in said other chamber, and means engaged between said resiliently urged means and other means to effect concert movement to the working positions thereof when fluid pressure in said first named chamber is less than the predetermined value.

17. A friction device operating mechanism comprising a housing, a pair of concentric piston means adapted for concert and relative movement, one of said piston means being slidable in said housing and defining therewith an expansible fluid pressure chamber, another expansible fluid pressure chamber defined between said piston means, resilient means normally urging said piston means in a direction to oppose expansion of said first named chamber, means connected with the other of said piston means and having a working end extending exteriorly of said housing, said other piston being movable relative to said one piston means in response to fluid pressure in said other chamber to actuate said last named means and the working end thereof, and said resilient means serving to concertly move said piston means in response to fluid pressure in said first named chamber less than a predetermined value to actuate said last named means and the working end thereof.

18. A friction device operating mechanism comprising a housing having an annular bore therein, a first piston slidable in said annular bore and defining therewith a first expansible fluid pressure chamber, a sleeve portion on said first piston means including an end wall, a second piston slidable in said sleeve portion and defining with said sleeve portion and end wall, a second expansible fluid pressure chamber, an actuating rod connected with said second piston and having a working end extending exteriorly of said housing, said second piston means being movable relative to said first piston means in response to fluid pressure in said second chamber to actuate said rod and the working end thereof, and spring means biased between said first piston means and said housing and normally opposing fluid pressure expansion of said first chamber, said spring means serving to move said first piston means in said housing in response to fluid pressure in said first chamber less than a predetermined value in a direction to engage said end wall with said second piston and effect concert movement thereof with said first piston to thereby actuate said rod and the working end thereof.

19. A friction device operating mechanism comprising a housing having an annular bore therein, a closure member connected with said housing and spaced from said annular bore, a bore in said closure member, a first piston including a head portion slidable in said annular bore and defining therewith a first fluid pressure chamber, and a cylindrical portion connected with said head portion and slidable in said closure member bore, another bore in said cylindrical portion, a second piston having a working end extending exteriorly of said housing and slidable in said other bore, a second fluid pressure chamber defined in said other bore between said first and second pistons, means for introducing fluid pressure into said second chamber, said second piston being movable in response to fluid pressure in said second chamber to a position actuating said working end, resilient means between said head portion of said first piston and closure member in opposition to fluid pressure expansion of said first chamber, and other means for introducing fluid pressure into said first chamber, said resilient means having a compressive force for urging said first piston in a direction in said housing to concertly move said second piston to a position actuating said working end when the fluid pressure in said first chamber acting on said head portion of said first piston in opposition to the compressive force of said resilient means is less than a predetermined value.

20. A friction device operating mechanism comprising a housing having an annular bore therein, said housing defining an axial opening radially inwardly of said annular bore, another axial opening in said housing spaced from said first named opening and substantially coaxial therewith, a pair of concentric piston means adapted for concert and relative movement, one of said piston means being slidable in said annular bore and said second opening and defining with said annular bore an expansible fluid pressure chamber, the other of said piston means being slidable in said one piston means and defining therewith another expansible fluid pressure chamber, said other piston means having a working end extending through said first named opening exteriorly of said housing, means in said housing and said one piston means for introducing fluid pressure into said chambers, respectively, said other piston means being movable relative to said one piston means in response to fluid pressure in said other chamber to an operative position energizing the working end thereof, and spring means biased between said housing and one piston means to oppose expansion of said first named chamber, the compressive force of said spring means being effective to urge said one piston means to an operative position in said housing upon fluid pressure in said first named chamber less than a predetermined amount, and abutment means on said piston means engageable upon movement of said one piston means to its operative position to provide for concert movement of said other piston means therewith to its operative position to energize said working end.

21. A friction device operating mechanism comprising a housing having radially spaced and axially extending inner and outer side walls interconnected by an annular base wall, another housing having another side wall threadedly engaged with at least a portion of said outer side wall, a bore in said other housing, piston means slidably engaged between said inner side wall and said other housing bore and defining therewith and with said base wall an expansible fluid pressure chamber, a sleeve portion connected with said piston means and extending axially therefrom, a bore in said sleeve portion, means connected with said sleeve portion and defining an end wall of said sleeve portion bore, other piston means slidable in said sleeve portion bore and defining with said end wall another expansible fluid pressure chamber including a working end extending exteriorly of said first named housing, said other piston means being independently movable in response to fluid pressure in said other chamber to actuate the working end thereof, and spring means engaged between said first named piston means and other housing and opposing fluid pressure expansion of said first named chamber, said first named piston means being movable against said spring means to an inoperative position in response to fluid pressure in said first named chamber in excess of a predetermined amount and said spring means bing extendable to mechanically engage said first named and other piston means and effect concert movement thereof to mechanically actuate the working end of said other piston means upon the reduction of fluid pressure in said first named chamber to an amount less than the predetermined amount.

22. The friction device operating mechanism according to claim 18 wherein said first piston comprises a pair of concentric piston head portions, and means engaged between said piston head portions to prevent relative displacement thereof.

23. The friction device operating mechanism according to claim 18 comprising an opening in said housing, extension means on said end wall extending through said opening, and disabling means adapted for driving engagement between said housing and extension in response to an applied force thereon to move said first piston against said spring means.

24. The friction device operating mechanism according to claim 8 comprising extension means on said resiliently urged means having a threaded bore therein, aperture means in said housing and substantially aligned with said threaded bore, and disabling means for insertion through said aperture means into bearing engagement with said housing and threaded engagement with said threaded bores, said last named means being movable in response to an applied force into further threaded engagement with said threaded bore to move said resiliently urged means relative to said housing in a direction to effect de-actuation of said working end.

25. The friction device operating mechanism according to claim 24 comprising a guiding projection on said housing telescopically arranged with said extension means and substantially coaxial with said aperture means.

26. The friction device operating mechanism according to claim 8 wherein said housing includes a closure member releasably secured thereto, a plurality of extension means on said resiliently urged means and each having threaded bores therein, aperture means in said closure member for alignment with said each of said threaded bores, at least one projection on said closure member telescopically arranged with one of said extension means to substantially maintain alignment between said aperture means and threaded bores, and driving means for insertion through said aperture means into bearing engagement with said housing and threaded engagement with said threaded bores, said driving means being responsive to an applied force thereon to further threadedly engage said threaded bore to drive said resiliently urged means in a direction to effect de-actuation of said working end.

27. The friction device operating mechanism according to claim 8 wherein said housing includes a closure member releasably secured thereto, an axial opening in said closure member, said resiliently urged means including piston means slidable in said housing and defining therewith said first named chamber, a sleeve member connected with said piston means and slidable in said axial opening, spring means engaged between said piston means and closure member and opposing fluid pressure expansion of said first named chamber, and an end wall engaged with said sleeve portion and defining therewith a bore in said piston means, said other means including another piston slidable in said sleeve member bore and defining with said end wall said other fluid pressure chamber, a plurality of extension means on said end wall and each having a threaded bore therein, aperture means in said closure member for alignment with each of said threaded bores, a projection on said closure member telescopically arranged with one of said extension means to substantially maintain alignment between said aperture means and threaded bores, and force responsive members for insertion through said aperture means into bearing engagement with said closure member and threaded engagement with said threaded bores, said force responsive members being movable in response to applied forces thereon into further threaded engagement with said threaded bores to move said piston means against the compressive force of said spring means to a disabled position in said housing and de-actuate the working end of said other piston means when the fluid pressure in said first named chamber is less than the predetermined value.

28. The friction device operating mechanism according to claim 27 wherein said end wall is slidable in said sleeve member bore, and abutment means engaged between said sleeve member and end wall to retain said end wall against displacement from said sleeve member bore in response to fluid pressure in said other chamber.

29. A friction device operating mechanism comprising a housing having inner and outer radially spaced side walls interconnected by an end wall, extension means integral with said outer side wall, first piston means including a cylindrical portion having a bore therein, a base wall connected to said cylindrical portion adjacent one end thereof and closing one end of the said bore, an annular flange connected to said cylindrical portion adjacent the other end thereof and slidably engaged with said outer side wall, an annular sealing member secured to said cylindrical portion adjacent said other end thereof and slidably engaged with said inner side wall, said flange and sealing member defining with said housing end wall an expansible chamber between said inner and outer side walls, a closure member connected with said extension means, second piston means slidable in said bore and having a working end exteriorly of said housing, another expansible chamber in said bore between said base wall and second piston means, means for introducing fluid pressure into said other chamber, said second piston means being movable in response to fluid pressure in said other chamber to energize the working end thereof, spring means interposed between said annular flange and closure member, and means for introducing fluid pressure into said first named chamber, said first piston means being movable against said spring means toward an inoperative position when the fluid pressure in said first named chamber is greater than a predetermined amount and said spring means being extendable to urge said first piston means toward an operative position to engage said second piston means and effect mechanical energization of the working end thereof when the fluid pressure in said first named chamber is less than the predetermined amount.

References Cited by the Examiner

UNITED STATES PATENTS 2,754,805   7/56   Beman _____ 92—63

RICHARD B. WILKINSON, *Primary Examiner.*

KARL J. ALBRECHT, *Examiner.*